United States Patent
Moro

(10) Patent No.: US 11,283,521 B2
(45) Date of Patent: Mar. 22, 2022

(54) SYSTEM AND METHOD OF SATELLITE COMMUNICATION

(71) Applicant: Meta Platforms, Inc., Menlo Park, CA (US)

(72) Inventor: Slaven Moro, San Diego, CA (US)

(73) Assignee: Meta Platforms, Inc., Menlo Park, CA (US)

(*) Notice: Subject to any disclaimer, the term of this patent is extended or adjusted under 35 U.S.C. 154(b) by 0 days.

(21) Appl. No.: 17/005,230

(22) Filed: Aug. 27, 2020

(65) Prior Publication Data
US 2020/0396003 A1    Dec. 17, 2020

Related U.S. Application Data

(62) Division of application No. 16/201,988, filed on Nov. 27, 2018, now Pat. No. 10,797,795.

(51) Int. Cl.
| | |
|---|---|
| *H04B 10/118* | (2013.01) |
| *H04L 1/00* | (2006.01) |
| *H04B 7/212* | (2006.01) |
| *H04B 7/185* | (2006.01) |
| *H04B 10/516* | (2013.01) |

(52) U.S. Cl.
CPC .......... *H04B 10/118* (2013.01); *H04L 1/0061* (2013.01); *H04B 7/185* (2013.01); *H04B 7/212* (2013.01); *H04B 10/516* (2013.01)

(58) Field of Classification Search
CPC .... H04B 10/118; H04B 10/516; H04B 7/212; H04B 7/185; H04B 7/2041; H04B 7/18515; H04B 7/18517; H04L 1/0061

USPC .......................................................... 398/125
See application file for complete search history.

(56) References Cited

U.S. PATENT DOCUMENTS

| | | | | |
|---|---|---|---|---|
| 6,181,676 | B1* | 1/2001 | Yao ........................... | H04J 1/10 370/217 |
| 6,297,897 | B1* | 10/2001 | Czichy ................. | H04B 10/118 398/122 |
| 9,379,815 | B2* | 6/2016 | Coleman ................. | H04J 14/02 |
| 9,735,859 | B1* | 8/2017 | Snyder ............... | H04B 7/18517 |
| 2002/0132578 | A1* | 9/2002 | Wiedeman ......... | H04B 7/18515 455/12.1 |
| 2004/0001720 | A1* | 1/2004 | Krill .................... | H04B 10/118 398/125 |

(Continued)

*Primary Examiner* — Abbas H Alagheband
(74) *Attorney, Agent, or Firm* — Baker Botts L.L.P.

(57) ABSTRACT

In particular embodiments, a system may include a spacecraft and optical ground terminals. The spacecraft includes at least an optical space terminal and a space switch unit. The space switch unit is configured to receive physical layer data frames from one optical space terminal, regenerate data-link layer data packets based on the physical layer data frames and route the regenerated data-link layer data packets to another optical space terminal. The optical ground terminals are configured to receive data-link layer data packets by one of the optical ground terminals, encode the received data-link layer data packets into physical layer data frames, transmit encoded physical layer data frames from one of the optical ground terminals to a respective optical space terminal through multiple forward channels at a data rate of 1 Tbps or above, the encoded physical layer data frames are decoded by the respective optical space terminal.

21 Claims, 13 Drawing Sheets

(56) References Cited

U.S. PATENT DOCUMENTS

| | | | |
|---|---|---|---|
| 2011/0268017 A1* | 11/2011 | Miller | H04B 7/2041 370/321 |
| 2013/0070666 A1* | 3/2013 | Miller | H04B 7/212 370/326 |
| 2013/0202311 A1* | 8/2013 | Xia | H04B 10/11 398/130 |
| 2014/0099122 A1* | 4/2014 | DeVaul | H04B 7/18504 398/124 |
| 2016/0182140 A1* | 6/2016 | DeVaul | H04B 10/11 398/115 |
| 2016/0204865 A1* | 7/2016 | Boroson | H04B 10/1121 398/97 |
| 2016/0204866 A1* | 7/2016 | Boroson | H04J 14/02 398/97 |
| 2017/0054527 A1* | 2/2017 | Birnbaum | H04L 1/0041 |
| 2017/0339695 A1* | 11/2017 | Wang | H04B 7/18513 |
| 2018/0019816 A1* | 1/2018 | Wang | H04B 7/18517 |

* cited by examiner

SYSTEM AND METHOD OF SATELLITE COMMUNICATION

PRIORITY

This application is a divisional under 35 U.S.C. § 121 of U.S. patent application Ser. No. 16/201,988, filed 27 Nov. 2018, which is incorporated herein by reference.

TECHNICAL FIELD

This disclosure relates to the field of satellite communication, and more particularly to optical satellite communication.

BACKGROUND

To provide quality Internet service to unconnected residences around the globe, the infrastructure required to make a high capacity practical necessitates major advancements in terrestrial, airborne, and space-borne telecommunications technologies. It is estimated that at several terabits-per-second (Tbps) telecom capacity per spacecraft, Internet delivery via satellites may become cost-competitive with the lowest-cost wired or wireless connectivity technologies. To realize this technological advance in telecom, substantial improvements in the capacity of today's satellite communications networks, whether in geostationary orbit (GEO) or medium-earth-orbit (MEO), low-earth-orbit (LEO) may be required.

Satellite data communication systems transfer data from a transmitter (TX) of one station to a receiver (RX) of another station. The TX or RX can be ground-based, airborne, or spaceborne. Furthermore, multiple ground-based stations (TX or RX) can be in communication with one or more air or space platforms (RX or TX). These ground/airborne/spaceborne telecommunication systems support uplink and downlink of large and ever-increasing volumes of data (e.g., Internet data).

To address high capacity and high performance needs, the fiber optics industry developed coherent fiber optic transceiver technologies using digital signal processors (DSPs) for the next generation of high-rate communications. DSP-based coherent transceivers increase performance of the satellite system using optical preamplification and offer higher spectral efficiency and lower power consumption. Moreover, the integrated photonics technology employed in coherent transceivers provides a competitive cost-benefit value.

SUMMARY OF PARTICULAR EMBODIMENTS

Currently, wireless or satellite Internet is often used in rural, undeveloped, or other hard to serve areas where the wired Internet is not readily available. As the Internet access grows rapidly, high aggregated user data rates may be required for large volumes of data communication. The satellite data communication system can provide quality Internet service to remote residences around the globe at very high data rates over longer distances and much more cost-effective than wired or wireless communication. The infrastructure required to make such a high capacity practical may necessitate major advancements in terrestrial, airborne, and space-borne telecommunications technologies. It is estimated that at several terabits-per-second (Tbps) telecom capacity per spacecraft may support uplink and return channel communication of large and ever-increasing volumes of data (e.g., Internet data). Current technologies for free-space optical/laser communications (lasercom) may allow multi-Tbps uplink capacity from a ground station to a MEO or GEO satellite along with Tbps-scale downlink capacity via a few beams. However, the total single spatial- and longitudinal-mode uplink laser power required to achieve multi-Tbps gateway link capacity per satellite is a limiting factor. Also, due to atmospheric effects, lasercom uplink and downlink availability per station may be limited (e.g., on the order of 50 to 60% for above average ground sites).

The embodiments described herein provide an apparatus, a system or a method that is directed to high data rates (e.g., 1 Tbps or above) satellite optical/laser communication through air and/or vacuum. Specifically, recovery of lost data frames is improved by applying data correction at the data-link layer over multiple spatially separated optical beams corresponding to channels at the physical layer. The system may comprise one or more optical ground terminals, a spacecraft comprising one or more optical space terminals and a space switch and Radio Frequency (RF) channel former, and one or more forward or return atmospheric channels. The optical space terminals may communicate with the optical ground terminals bi-directionally through the atmosphere/vacuum space via the forward or return atmospheric channels.

Particular embodiments may provide optical communication with earth-orbiting satellites using Optical Feeder Links (OFLs) to support high data rate optical satellite communication through air and/or space. The Optical Feeder Links are the connections between ground stations and a telecommunication satellite, which utilize laser and optical technologies to send and receive data (e.g., Internet Traffic). Optical Feeder Links offer terabit/second throughput, with unmatched low cost per bit, secure and immune from jamming and interference. The optical satellite communication uses optical beams to transmit data through the atmosphere or the atmosphere and vacuum. The data may be communicated between two ground terminals, a ground terminal and a space terminal, two space terminals, or any suitable configuration of terminals. Additionally, any of the space terminals or ground terminals in any of the configurations described herein may operate as transmitters, receivers, or transceivers.

The embodiments disclosed herein are only examples, and the scope of this disclosure is not limited to them. Particular embodiments may include all, some, or none of the components, elements, features, functions, operations, or steps of the embodiments disclosed above. Embodiments are in particular disclosed in the attached claims directed to a method, an apparatus, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
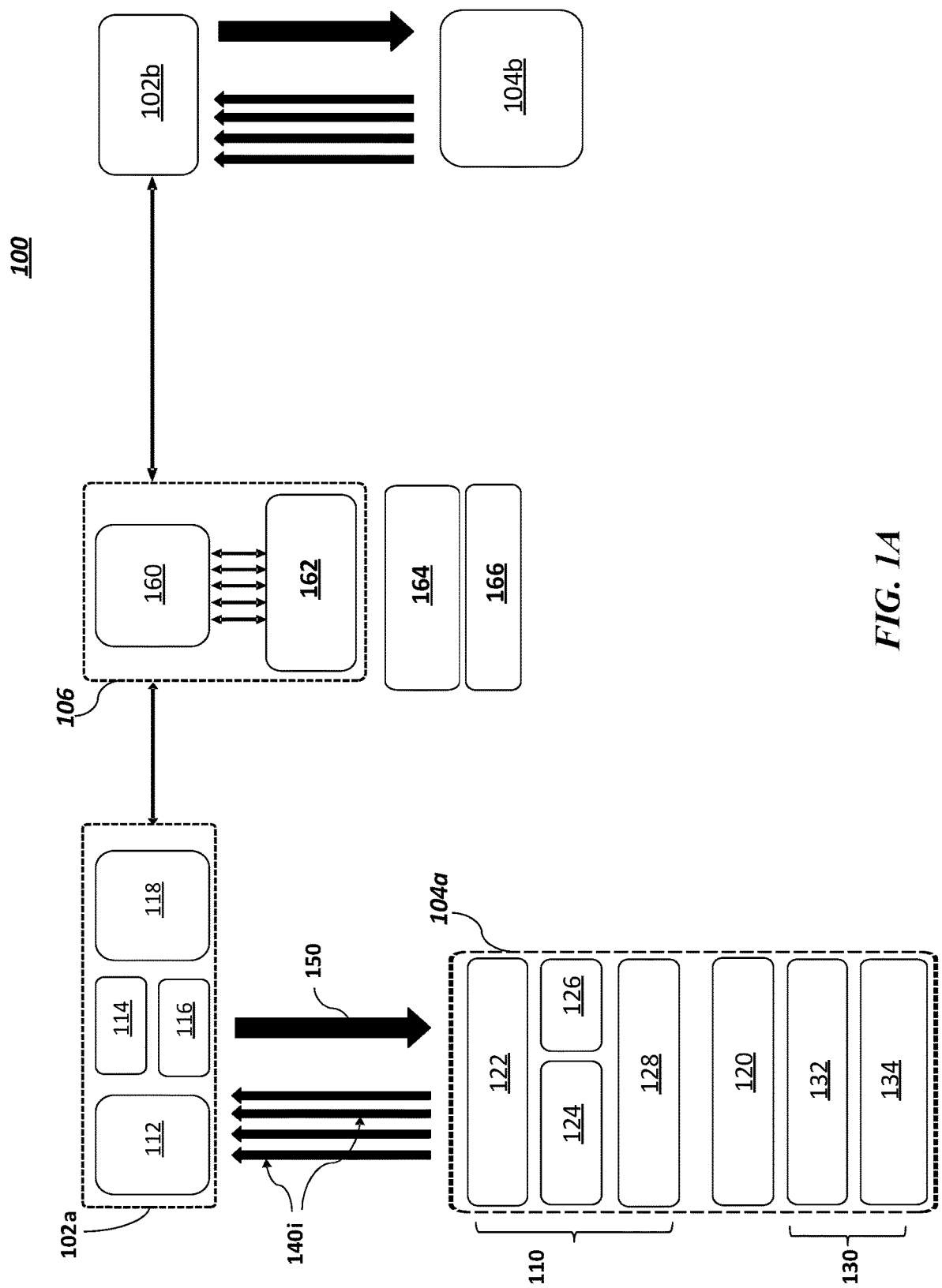
FIG. 1A illustrates an example satellite communication system in accordance with particular embodiments.

Specific details of particular embodiments of representative optical data communication systems and methods thereof are described below. The inventive technology is directed to communication links between ground station(s) and airborne or spaceborne platforms at data-rates that have not been possible before and with mass/power/size that is significantly lower than transceivers that use conventional technology.

Briefly described, the inventive technology uses multiple optical beams to communicate data through the atmosphere or through the atmosphere and vacuum. The data may be communicated between two ground stations, between a ground station and an airborne platform, between two airborne or two spaceborne platforms, between an airborne platform and a spaceborne platform, or any suitable combination thereof. Additionally, any of the stations or platforms in any of the configurations described herein may operate as transmitters, receivers, or transceivers. The individual optical beams (which may correspond to individual channels) can carry independent data to establish multiple independent links from a transmitter (TX) to a receiver (RX), therefore increasing the throughput of the system. The individual optical beams can operate on different wavelengths. The beams may be produced by optical sources such as lasers or light emitting diodes. In at least some embodiments, the inventive technology uses advanced modulation formats and coherent detection (e.g., dual-polarization quadrature-phase-shift keying (DP-QPSK), binary PSK (BPSK), or Quadrature Amplitude Modulation (QAM)) in conjunction with multiple optical beams, which were previously thought to be incompatible). In other embodiments, the inventive technology uses direct detection (e.g., intensity modulated direct detection). Any suitable modulation format or technique may be employed.

Some embodiments of the inventive technology use coherent optical communication. In coherent optical communications systems, information to be conveyed across a link is modulated onto the amplitude and phase of a transmitted optical carrier signal as a sequence of symbols chosen from a fixed alphabet of amplitude and phase pairs according to the data to be conveyed. As information is now encoded in the phase of the received optical signal, it cannot be directly recovered, as in a direct detection scheme, by a photo-detector, which measures intensity. To recover the phase of the received signal, there are several different types of demodulator structures that can be used. These demodulators can be variants on the method of mixing the received optical signal with a local reference signal, which results in the intensity of the mixed signal being a function of the difference between the received signal phase and the local reference. This can then be measured by a photo-detector and processed to estimate the transmitted symbol and corresponding transmitted data sequence.

The inventive technology uses multiple beams separated spatially by a distance D, where D»$r_o$, where $r_o$ is a radius of a beam of light and is compatible with coherent communications. We use multiple transmitters that are spatially separated. In particular embodiments, each transmitter sends light that can be separated from the light sent by the other transmitters. In particular embodiments, this separability is implemented by having each transmitter use a distinct optical carrier frequency, such that the spectrum used by each transmitter is generally distinct and non-overlapping. Each transmitter can have adequate spatial separation from the others, such that the fading process is statistically independent on each transmitter.

In particular embodiments, each transmitter-to-receiver link can implement an independent physical layer forward error correction (FEC) code and channel interleaver that are designed to target channel impairments whose coherence time is much less than that of the frequency non-selective fading. Under some scenarios, this may result in blocks of codewords that are not recoverable by the physical layer FEC when the signal level drops below the receiver sensitivity threshold (due to channel fading). To correct for these errors, data-link layer FEC is introduced. The data-link layer FEC encoder operates across the individual channels and may have support across multiple channel coherence times. In the event that the physical layer FEC and data-link layer FEC codes were unable to recover the transmitted information, a transport layer protocol, such as TCP, can utilize an ARQ scheme as necessary to retransmit lost data frames.

Prior to sending the data through the atmosphere, one or more data frames are encoded with a data-link layer FEC code. In particular embodiments, the data-link layer FEC code is an erasure code. In particular embodiments, the erasure code used can be a fountain code. In particular embodiments, each data-link layer FEC encoded data frame (referred to herein as "encoded data frame") may then be sent to one of multiple channels (described in further detail below). Within a channel, the symbols of the encoded data frames are encoded with a physical layer FEC code that can be exploited at the receiver to correct for errors due to a number of effects including channel fading. At the physical layer, the use of codeword interleaving at the transmitter and corresponding codeword de-interleaving at the receiver will spread a burst of errors across multiple codewords for correction by the decoder. The interleaved codewords of a particular channel are then modulated onto light of a designated wavelength for that channel (which may be different for each of the multiple channels) and then transmitted through free space. At the RX, the light is collected by the receive aperture or apertures. The received signal may then pass through a demultiplexer to produce data from individual optical beams (e.g., from the individual channels). The data in each individual channel can then be demodulated, de-interleaved to reconstitute the codewords, and then decoded to reconstitute the encoded data frames. Finally, one or more reconstituted encoded data frames are passed through the data-link layer FEC decoder to produce the reconstituted data frames. Therefore, at the RX, a particular data frame can be: (i) received fully (e.g., no errors in the data frame); (ii) recovered using the error correction for that channel; or (iii) be non-recoverable using the error correction for that channel (e.g., the data frame includes too many errors rendering it unrecoverable). Instead of declaring as lost the non-recoverable data frame and retransmitting it, the inventive technology applies additional data frame recovery across one or multiple channels to improve the overall frame recovery. For example, data-link layer FEC in the form of an erasure code (e.g., a "fountain code") can be implemented over multiple data frames prior to transmitting data frames from the TX to the RX over individual channels. If the recovery within the channel fails, the data-link layer FEC erasure code applied over multiple channels and data frames may be used in many cases to recover the erased data frame without retransmitting the data frame and without the concomitant increase in the latency of data transmission.

FIG. 1A illustrates an example satellite communication system in accordance with particular embodiments. The satellite communication system 100 may comprise one or more optical space terminals 102a and 102b, one or more optical ground terminals 104a and 104b, and a space switch and RF channel former 106. The communications between the optical space terminals 102a and 102b and the respective optical ground terminals 104a and 104b can be bi-directionally through one or more atmosphere channels. The optical space terminals 102a and 102b can have receivers (RXs) for receiving uplink data from the respective optical ground terminals 104a and 104b, wherein the optical ground terminals 104a and 104b may have counterpart transmitters (TXs) for transmitting the uplink data. In particular embodiments, TXs may reside in the optical space terminals 102a and 102b while the counterpart RXs reside in the optical ground terminals 104a and 104b, wherein the TXs encode the data frames while the counterpart RXs decode the encoded data frames. Vice versa, RXs may reside in the optical space terminals 102a and 102b while the counterpart TXs reside in the optical ground terminals 104a and 104b, wherein the RXs decode the data frames while the counterpart TXs encode the encoded data frames.

In particular embodiments, the optical ground terminals 104a and 104b may comprise a physical layer 110 at the lowest level, and/or a data-link layer 120. Next level above the data-link layer 120 may be a network layer 130 including a network/traffic management interface 132 and a fiber network interface 134.

The network layer 130 delivers data in the form of packets from a source to a destination of a system (e.g., satellite system). In general, the network layer 130 may use a data-link layer and a physical layer to deliver the packets from the source to the destination. The data can be received at the network layer 130, wherein the network layer 130 can be a high rate network layer (e.g., 100 GbE or above) of the satellite communication system. The received data may be connected to the fiber optic networks through the fiber network interface 134. The fiber network interface 134 can be integrated into the computation devices, or other components in the fiber optic networks. For example, a 10+ Gb fiber network interface can be used in a 100 GbE network of the satellite communication system. The fiber network interface 134 can be a gateway allowing computation devices to be connected to various types of fiber optic networks.

The network traffic management interface 132 can filter and route the network traffic to an optimum resource for significantly increasing network performance. In particular embodiments, the network traffic management interface 132 can assign user beam labels to the received protocol packets (e.g., IP packets) and route the labeled IP packets to the next layer (e.g., the data-link layer 120).

At the data-link layer 120, the bits of the received data packets are arranged into data frames for delivering to the satellite system. The data frames are encoded by the data-link layer erasure encoder and sent as bit streams through the physical layer 110. The physical layer 110 contains functionality necessary to carry the stream of data bits to the optical space terminals 102a and 102b through a medium. The physical layer 110 may comprise an optical beam control 122, optical power amplifiers (PA) 124, optical low noise amplifiers (LNA) 126, optical modem & channel encode/decode components 128. The encoded data frames may be distributed to one of the multiple data channels in the physical layer 110 by a distributor. In each of the multiple data channels, the encoded data frames may be encoded again by a physical layer FEC channel encoder into codewords, and the codewords may be converted to the optical signals by the optical modem. In the physical layer 110, the electrical signals may be converted to the optical signals by the optical modems, where the electrical signals may be embedded with optical or laser beams. The optical beams, such as laser light carrying the electrical signals, may be modulated by a modulator and amplified by one of the optical LNAs 126 and/or one of the optical PAs 124, wherein the optical PAs 124 may have a power of 100 watts (W). The amplified optical beams may be emitted through the medium by the optical beam control 122. The optical beam control 122 may ensure that the laser beams are pointed to a respective spacecraft or the optical space terminal. Especially, since the spacecraft or the optical space terminals 102a and 102b may be moving objects, the optical beam control 122 may track the position of the moving objects and configure the optical ground terminals 104a and 104b to follow the moving object precisely.

In particular embodiments, the optical space terminals 102a and 102b may comprise a physical layer including an optical beam control 112, an optical power amplifier (PA) 114, an optical low noise amplifier (LNA) 116, optical modem & channel encode/decode components 118 including an optical modem and a channel decoder or encoder. In the physical layer, the optical beam control 112 may ensure that a respective optical ground terminal points and follows the optical space terminal precisely for receiving the optical beams. The optical beams may be received by the optical beam control 112 and be amplified by the optical PA 114 and/or optical LNA 116. The amplified optical beams may be demodulated by a demodulator and converted to the electrical signals by the optical modem.

During the forward channel communication, the optical ground terminal 104a may emit optical beams carrying encoded data to the optical space terminal 102a through multiple uplink atmosphere channels 140i (e.g., four uplink channels), wherein the received optical signals may be decoded and converted from the optical signals to the electrical signals. During the return channel communication, the optical space terminal 102a may emit optical beams carrying encoded data to the optical ground terminal 104a through a downlink atmosphere channel 150, wherein the received optical signals may be decoded and converted from the optical signals to the electrical signals. Each of the optical ground terminals 104a and 104b may be coupled with a respective optical space terminal. While a forward channel communication may be conducted by one pair of the optical ground terminal (e.g., optical ground terminal 104a) and optical space terminal (e.g., optical ground terminal 102a), a return channel communication may be conducted by a different pair of optical ground terminal (e.g., optical ground terminal 104b) and optical space terminal (e.g., optical ground terminal 102b) concurrently. In particular embodiments, the return channel communication may have multiple return atmosphere channels.

Additionally, a transport layer above the network layer 130 may be tasked with process-to-process delivery. For example, a process may require multiple data packets to transfer a complete email message with a suitable order of the packets, confirmation of the error-free status of the packets, etc. The next level of abstraction above the transport layer is an application layer that specifies the shared protocols and interface methods used by the hosts in a communications network. The transport layer and the application layer are not shown in FIG. 1.

In particular embodiments, the space switch and RF channel former 106 including a space switch 160 may control the operation of the optical space terminals 102a and 102b, such as the communications between the optical space terminals 102a and 102b and the respective optical ground terminals 104a and 104b, or the communications between the optical space terminals 102a and 102b. Further, the space switch 160 may function as a make-before-break (MBB) switch which may detect upcoming communication troubles and redirect communication from one of the optical space terminals to another one of the optical space terminals to avoid communication interruption. For example, in the event that the communication between an optical space terminal 102a and an optical ground terminal 104a encounters problem (e.g., bad weather), the space switch 160 can redirect the communicate from the optical space terminal 102a to another optical space terminal 102b which is available at current moment. Therefore, the communication can be continued between the optical space terminal 102b and the optical ground terminal 104a to prevent the interruption. In particular embodiments, the upcoming communication troubles may be detected by the optical space terminals 102a and 102b, the optical ground terminals 104a and 104b, or any other components in the satellite communication system.

In particular embodiments, the satellite communication system can build an optical communication channel, which enables the satellite communication system to fully regenerate user information packets on a spacecraft and route the user's information packets among the optical space terminals. The spacecraft mounted with the one or more optical space terminals can function as a data center on which the user's information data packets can be routed from one destination to another destination, such as from San Diego to Menlo Park, wherein each destination may be associated with a corresponding optical space terminal. The space switch and RF channel former 106 may include a regenerative multi-channel RF modem 162, which may comprise encoder/decoder and modulator/demodulator. The multi-channel RF modem 162 may comprise 100-1000 channels, each channel may have a symbol rate of 50-1000 Msym (symbol) per second and a power of 2-4 W. Above the space switch and RF channel former 106, the spacecraft may include an up/down converter 164 for controlling the uplink and return channel communication and PA/LNA combinations 166, wherein each of the multiple channels may have a corresponding PA/LAN combination for filtering the noise and enhancing the signals.

Figure 1B:
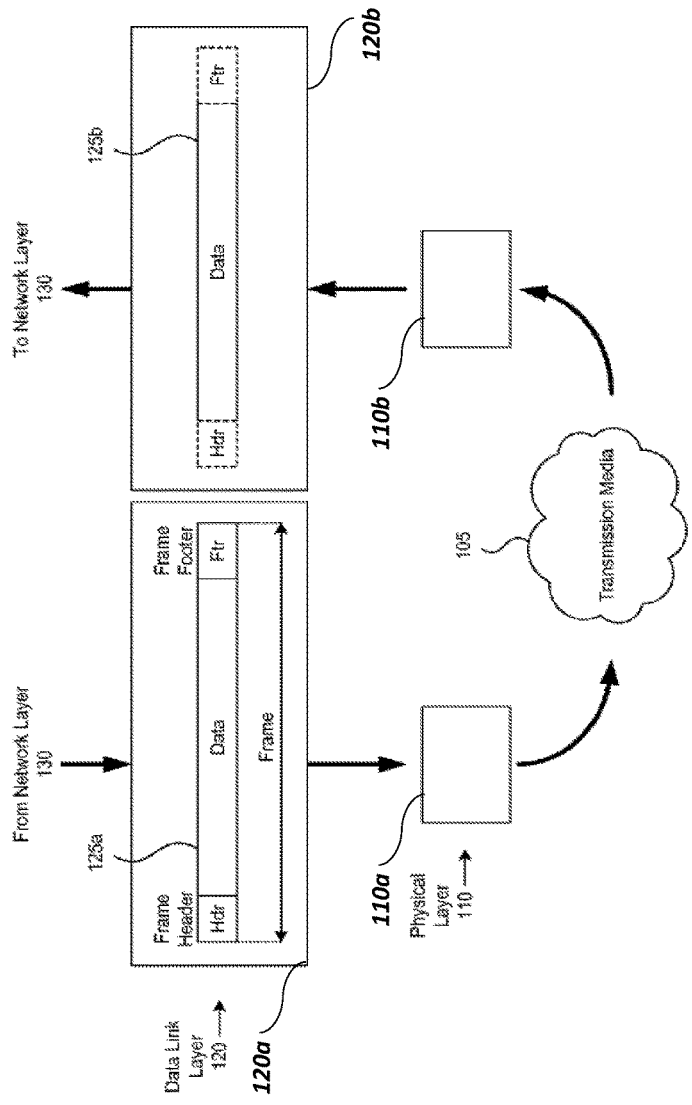
FIG. 1B illustrates an examples data transmission of a satellite communication system in accordance with particular embodiments.

FIG. 1B illustrates an examples data transmission of a satellite communication system in accordance with particular embodiments. The data transmission may involve multiple layers including the physical layer 110, the data-link layer 120, and the network layer 130 of FIG. 1A. Data frames of the uplink or downlink data can be formed at a transmitting data-link layer 120a to include data bits and frame header/footer. The data frames 125a may be transferred to a transmitting physical layer 110a, where the data frames 125a can be modulated and sent through a transmission medium 105 (e.g., the atmosphere or optical fiber). This stream of data bits can be reformatted as a new data frame 125b at a receiving data-link layer 120b through a receiving physical layer 110b in the optical space terminals 102a and 102b. In some instances, the header/footer data may be removed, and the new data frame 125b is next passed to the network layer for further routing.

Figure 2:
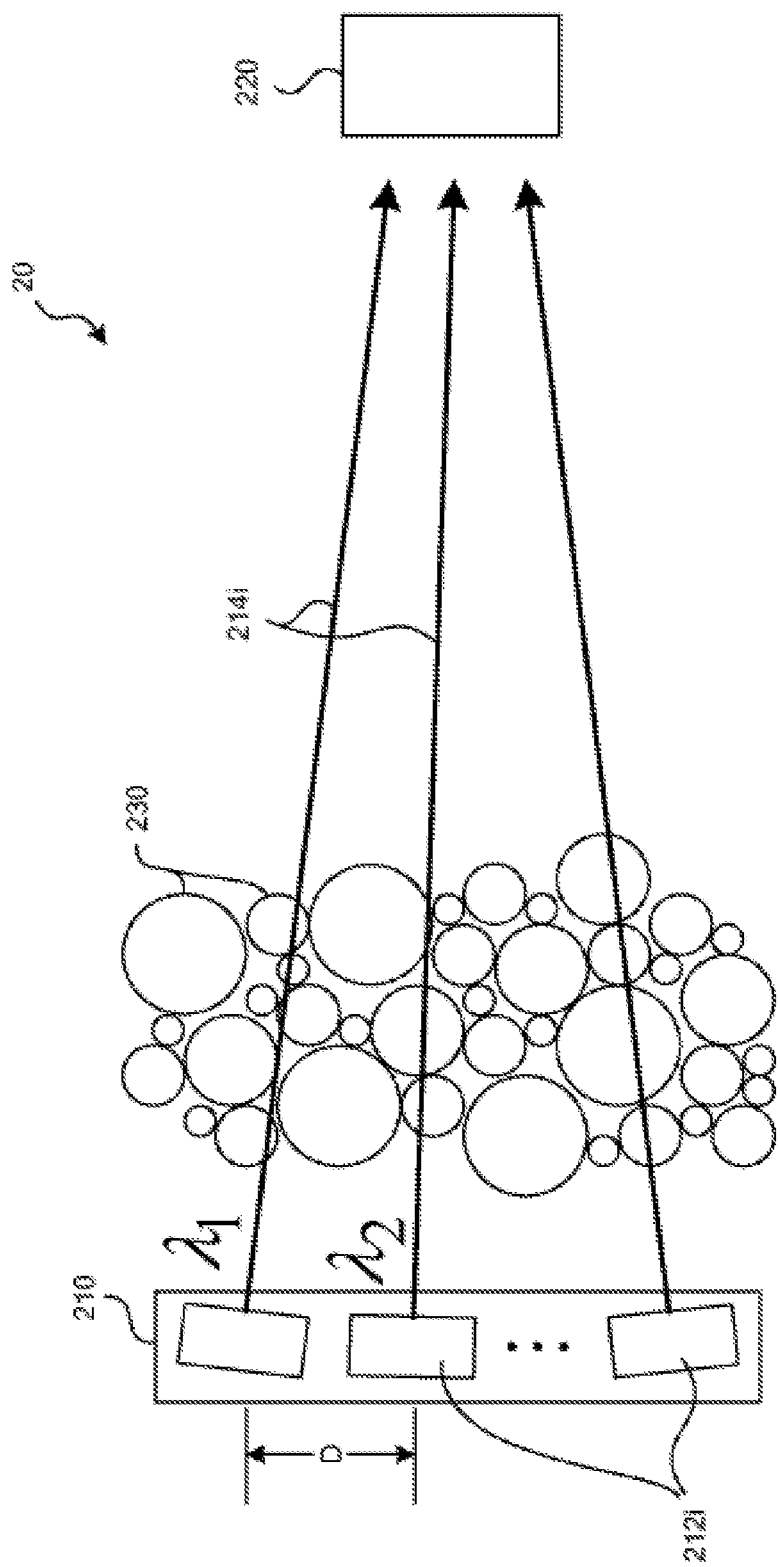
FIG. 2 is a simplified illustration of the optical data transmission through the atmosphere in accordance with particular embodiments.

FIG. 2 is a simplified illustration of the optical data transmission through the atmosphere in accordance with particular embodiments. For example, the optical data transmission through the atmosphere may occur between the optical space terminal 102a and the optical ground terminal 104a through multiple uplink atmosphere channels 140i of FIG. 1A. A TX 210 may reside in the optical ground terminal 104a and a counterpart RX may reside in the optical space terminal 102a, or vice versa.

A multi-channel system 20 can have the TX 210 that includes multiple apertures 212i for transmitting data streams that are encoded in laser beams 214i. The laser beams 214i can operate at different wavelengths Ai. As illustrated in the example of FIG. 2, each beam 214i may carry light at a single wavelength corresponding to a single data stream or channel. In other embodiments, each beam 214i may carry light at multiple wavelengths corresponding to multiple data streams or channels. Although the specific example of laser beams is provided, it is contemplated that in particular embodiments, optical sources other than lasers can be used including, for example, light emitting diodes. The separation between any two adjacent beams 214i is denoted as D. In at least some embodiments of the inventive technology, the laser beams 214i transmit independent data streams through the air or vacuum, therefore increasing throughput of the system 20. The laser beams 214i are received by one or more RX's 220 that include receiving apertures and suitable optics to allow demodulators to coherently demodulate the modulated optical signal into a sequence of numerical values that estimate the transmitted symbol or a set of likelihood ratios for each possible symbol realization. In particular embodiments, one of the TX 210 and RX 220 can reside at a ground station, while its RX/TX counterpart is airborne or spaceborne.

In other embodiments, both the TX and RX can be ground-based or airborne/spaceborne. In at least some embodiments, turbulence 230 causes uneven densities of air along the path of the laser beam. These uneven densities of air in turn change the refractive index along the path of the individual laser beams 214i. Propagation through the variable refractive index along the beams' path results in different intensities of the laser beams 214i arriving at the RX 220. Therefore, the data streams of the laser beams 214i experience signal fading to differing degrees. In at least some embodiments, the separation between the beams D is large enough that the fading process is not correlated between beams 214i. Depending on sensitivity of the RX 220, signal intensity in some laser beams 214i may fall below the sensitivity level of the RX, thus causing errors in the data stream. As explained above, moderate signal fading and/or other data errors in the channel may be corrected using the physical layer FEC code and channel interleaving. The physical layer FEC scheme can be based, for example, on low-density parity-check codes (LDPC), turbo product codes, or braided or concatenated algebraic codes such as BCH or Reed Solomon. However, in many practical applications the physical layer FEC code cannot correct for severe channel-fading-induced errors. In particular embodiments, when the physical layer error correction within the channel cannot fully recover the lost data frames, an additional error correction across the channels performed at the data-link layer 120 is used to avoid retransmission of the data frames. The error correction at the data-link layer is explained with reference to FIG. 3A below.

Figure 3A:
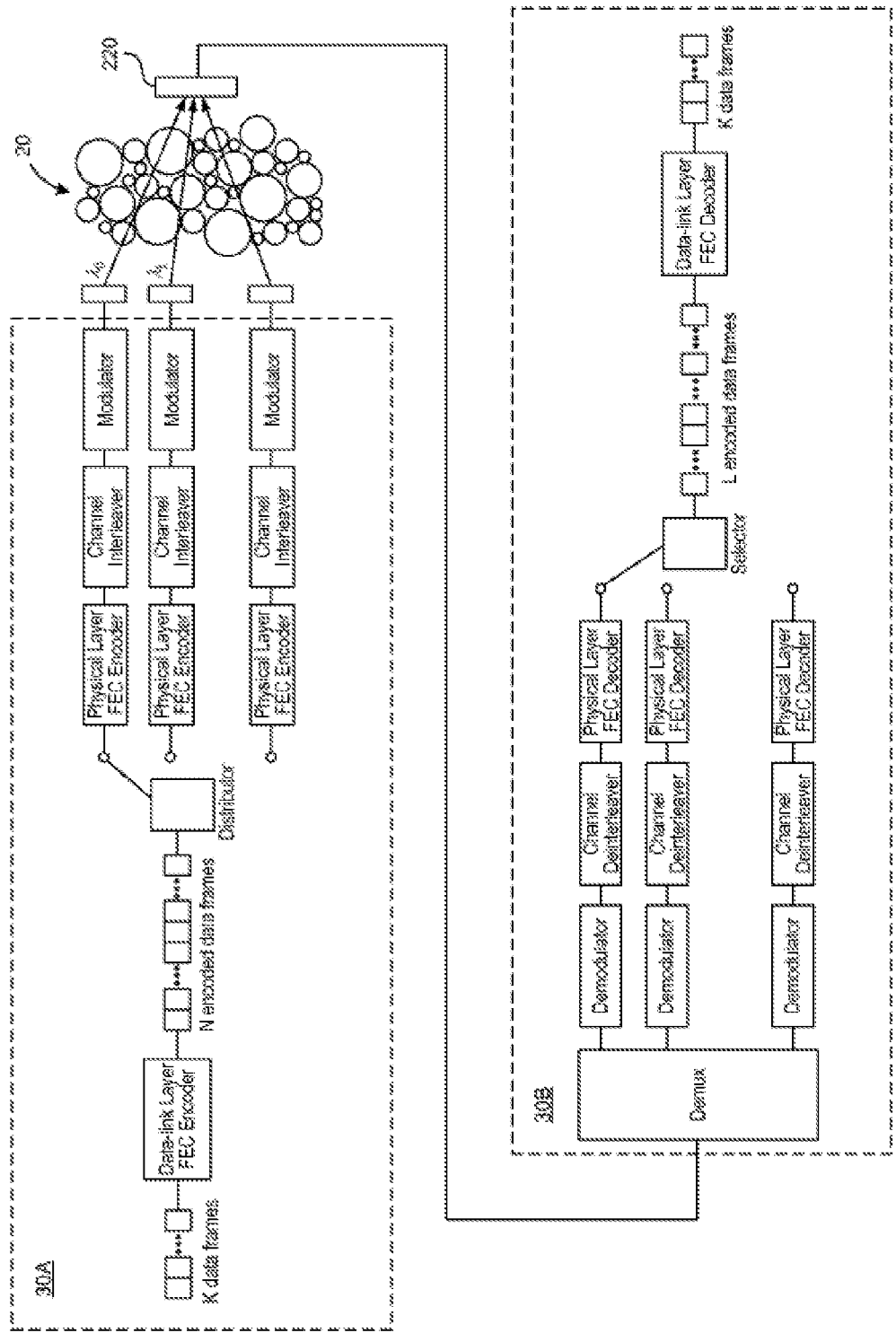
FIG. 3A is a schematic illustration of a system for data transmission between a TX and a RX in accordance with particular embodiments.

FIG. 3A is a schematic illustration of a system for data transmission between a TX 30A and a RX 30B in accordance with particular embodiments. In particular embodiments, each of the TX 30A and/or RX 30B can be on the ground, airborne or spaceborne. Multiple laser beams of the multi-channel system 20 can transfer independent data streams between the TX 30A and RX 30B to increase the throughput of the data transmission. Details of the TX 30A and RX 30B and the functionalities thereof are discussed in the following sections.

Figure 3B:
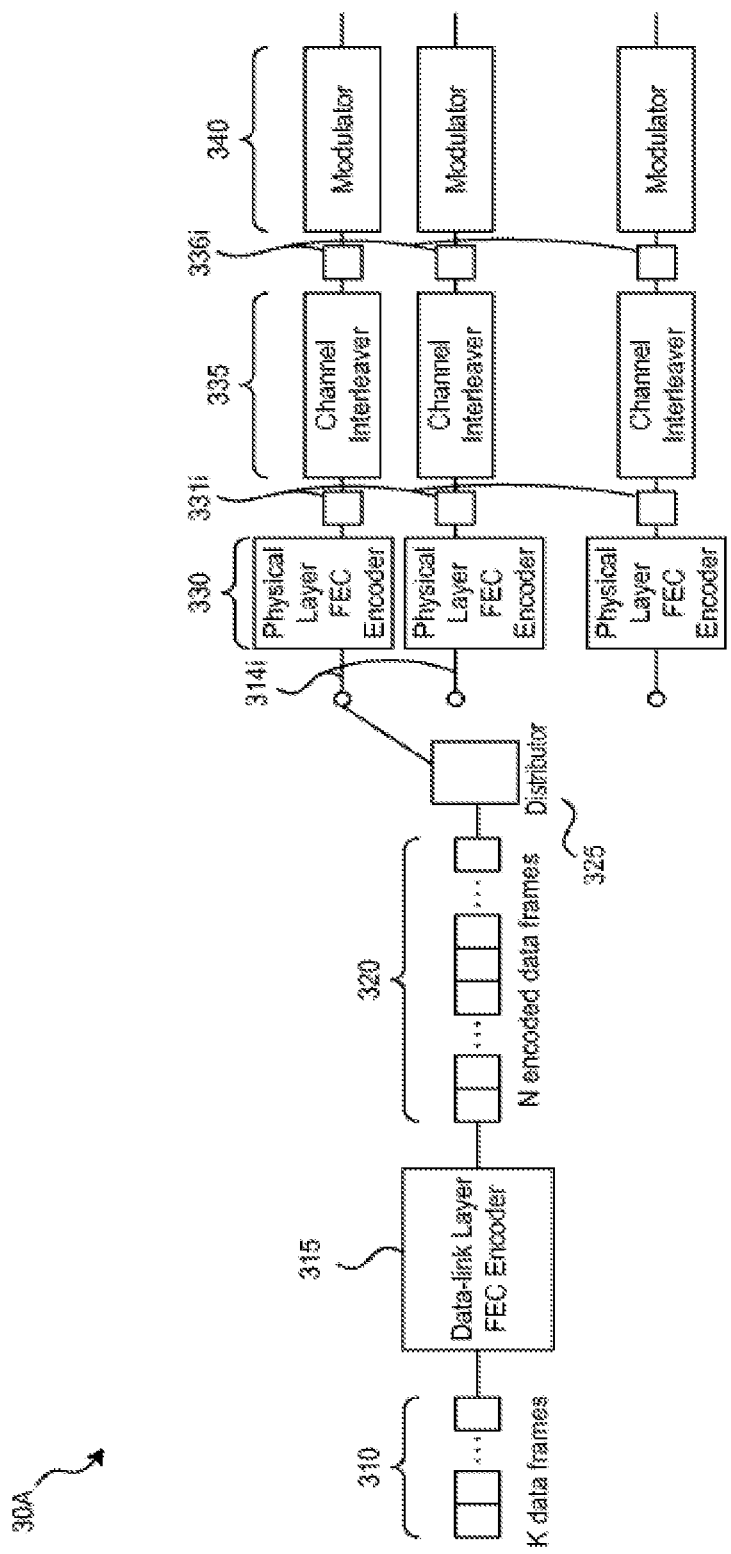
FIG. 3B is an example schematic illustration of the TX of the system in FIG. 3A in accordance with particular embodiments.
Figure 3C:
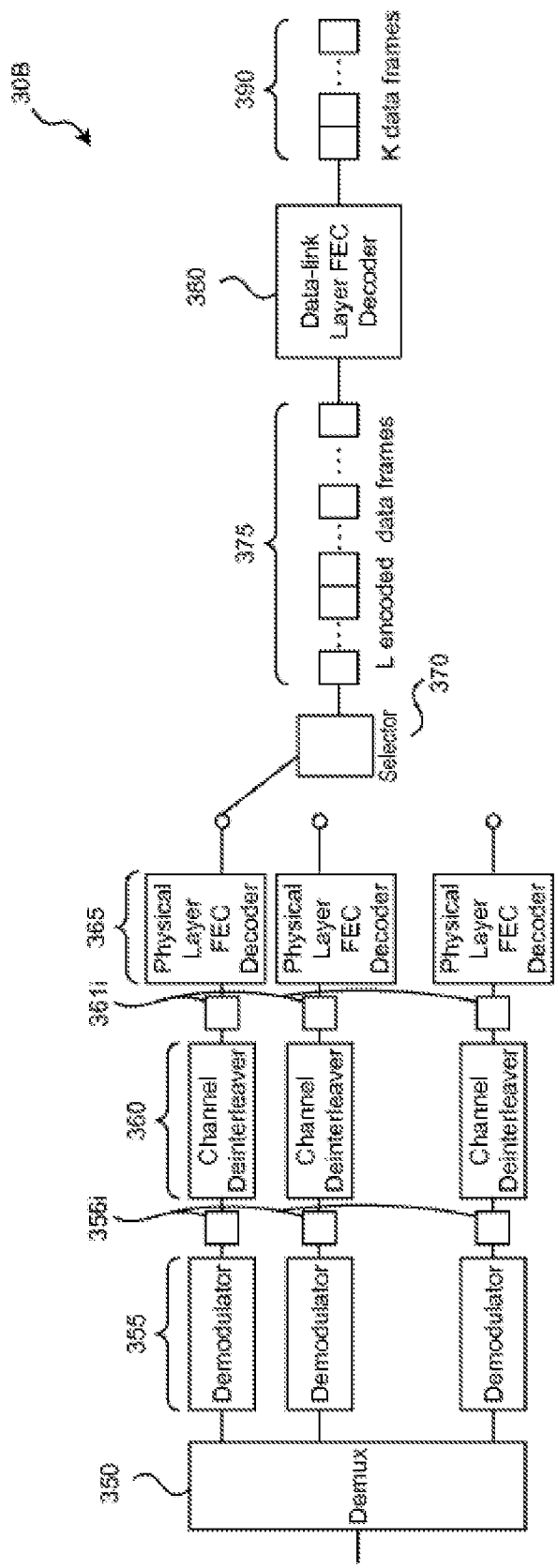
FIG. 3C is an example schematic illustration of the RX of the system shown in FIG. 3A in accordance with particular embodiments.

FIG. 3B is an example schematic illustration of the TX of the system in FIG. 3A in accordance with particular embodiments. FIG. 3C is an example schematic illustration of the RX of the system shown in FIG. 3A in accordance with particular embodiments. FIG. 3B illustrates the TX 30A that processes K data frames 310. The incoming data frames 310 can be encoded using a data-link layer FEC encoder 315. For example, the data-link layer FEC code can be applied to a sequence of K data frames 310 to produce a sequence of N encoded data frames 320. In particular embodiments, the first K encoded data frames 320 can be identical to the original K data frames 310 to reduce average latency of the data transfer, while the subsequent N–K encoded data frames 320 are used as repair frames. In particular embodiments of the present technology, the data-link layer FEC encoder 315 is an erasure code encoder that uses fountain codes to generate N encoded data frames 320 from the K data frames 310. As explained below with reference to FIG. 3C, a RX can use the fountain code to decode the received encoded data frames and to recover the missing data frames that were not recoverable using physical layer FEC decoding. Therefore, the encoded data frames 320 can be used to recover the lost data frames at the data-link layer, thereby obviating the need to retransmit the lost data frames over the higher network layers having higher data latency.

In particular embodiments, each of the N encoded data frames 320 are passed through a distributor 325 and are routed to one of multiple data channels 314i. In particular embodiments, the system 30A includes G multiple data channels 314i in parallel. A sequence of N encoded data frames 320 can be distributed across multiple independent data channels 314i, with a subset of the encoded data frames 320 being sent over each independent data channel 314i. In particular embodiments, the distributor 325 distributes encoded data frames to data channels in a round-robin fashion. In particular embodiments, the encoded data frames 320 are further encoded using physical layer FEC encoders 330 in each data channel to encode the encoded frames 320 into codewords 331i. In each data channel, the physical layer FEC encoder 330 encodes additional error-correction bits to the encoded data frames 320, allowing for the correction of some channel errors at the receiver after the codewords are received in the corresponding data channel of the RX. After the physical layer FEC encoder 330, the symbols of the codewords 331i can be interleaved by channel interleavers 335 into interleaved codewords 336i. In particular embodiments, for each data channel, a modulator 340 modulates the laser light of a designated wavelength according to symbols/bits of the interleaved codewords 336i. As explained above, the interleaved and modulated codewords can be transmitted from the TX 30A to the RX 30B through independent transmission medium channels (e.g., using multiple laser beams 214i across air or space) in parallel to increase throughput of the data transmission. Each of the plurality of spatially separated beams 214i may carry data from one or more of the data channels.

In FIG. 3C, the interleaved and modulated codewords can be received through single or multiple apertures 350 and de-multiplexed into individual data channels that each correspond to a particular wavelength. Within each data channel, demodulator 355 can demodulate the received data into interleaved codewords 356i. In particular embodiments, in each data channel, the deinterleaver 360 restores the sequence of symbols of the individual interleaved codewords 356i to their pre-interleaved ordering in 361i. Next, physical layer FEC decoder 365 operates on the codewords 361i of the data channel to correct the bit/symbol errors in the codewords 361i of the particular data channel. This may occur in each of the G data channels in parallel. In this step, the encoded data frames are reconstituted from the physical layer FEC decoded symbols/information bits. If the number of errors in a particular codeword 361i is below the threshold that the physical layer FEC decoder 365 is designed to correct, the original encoded frames 320 contained within or portions encompassed by the codeword are reconstructed and exported as encoded data frames 375. However, if the number of errors in a codeword 361i exceeds the correction capability of the physical layer FEC decoder 365, that codeword is declared un-decodable and all encoded data frames contained within the codeword or that have portions encompassed by the codeword may have uncorrectable errors which upon detection will result in that encoded data frame being declared as erased. In general, depending on the number of the correction bits available to the physical layer FEC decoders 365, not all channel errors will be correctable, resulting in at least some lost encoded data frames.

To recover the erased encoded data frames that are un-decodable with the physical layer FEC decoders 365, an additional data frame recovery can be executed over multiple encoded data frames 375 using data-link layer FEC decoder 380, which, for example, may use erasure codes such as fountain codes. If successful, this data frame recovery at the data-link layer reconstructs the original data frames 310 without the generally undesirable requirement of retransmission of the data frames through higher layers (e.g., at the transport layer). In particular embodiments, prior to being received by the data-link layer FEC decoder 380, the sequence of encoded data frames can be sent through a selector 370 as L encoded data frames. The selector 370 may operate at the frame rate of the receiver. In particular embodiments, the selector 370 may perform buffering and/or reordering of the encoded data frames 375 prior to sending them, one frame at a time, to the data-link layer FEC decoder 380. The data-link layer FEC decoder 380 produces output frames 390, which may or may not be the same as original data frames 310. The data-link layer FEC decoder 380 will succeed at recovering all of the original frames 310 (i.e., output frames 390 will be the same as original frames 310) provided that L is greater than or equal to K+O where O, called the overhead, is a property of the data-link layer FEC. The code parameters, N, K, 0, and the size of the data frame are chosen to meet a desired performance level, typically a bit error or a packet loss rate, while trading off the throughput and latency.

Figure 4:
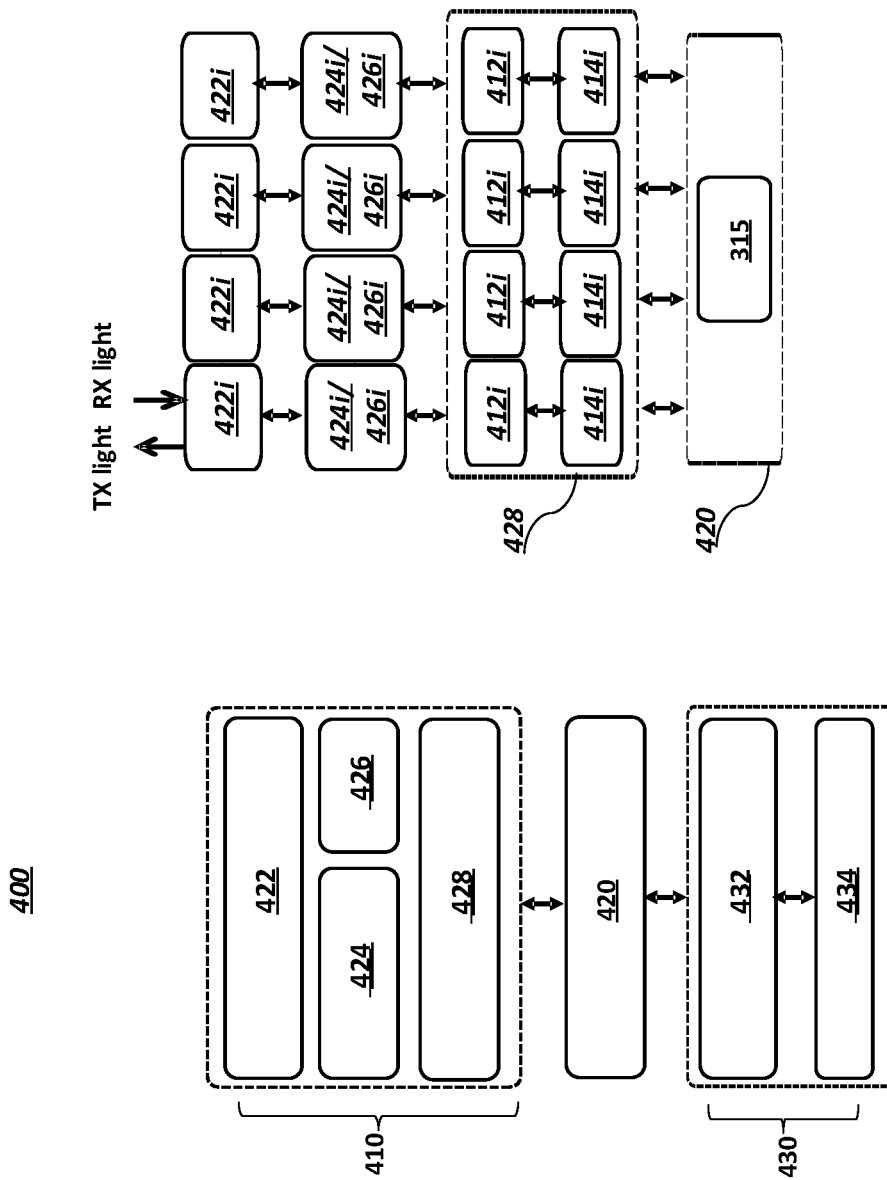
FIG. 4 is a block diagram of an example optical ground terminal of a satellite communication system shown in FIG. 1 in accordance with particular embodiments.

FIG. 4 is a block diagram of an example optical ground terminal of a satellite communication system shown in FIG. 1 in accordance with particular embodiments. The optical ground terminal 400 may comprise a physical layer 410 at the lowest level, and/or a data-link layer 420, and/or a network layer 430. The level above the data-link layer 420 may be a network layer 430 including a network/traffic management interface 432 and a fiber network interface 434.

As described above, the network layer 430 delivers data in the form of packets from a source to a destination of a receiving system (e.g., satellite system). The data can be received at the network layer 430, and the received data may be connected to the fiber optic networks through the fiber network interface 434. The fiber network interface 434 can be a gateway allowing computation devices to be connected to various types of fiber optic networks.

In particular embodiments, the network traffic management interface 432 can filter and route the network traffic to an optimum resource for significantly increasing network performance. The network traffic management interface 432 can assign user beam labels to the received protocol packets (e.g., IP packets) and route the labeled IP packets to the next layer (e.g., the data-link layer 420). For example, a first group of IP packets is labeled with user beam one, a second group of IP packets is labeled with user beam two, a third group of IP packets is labeled with user beam three, a fourth group of IP packets is labeled with user beam four, etc. The network traffic management interface 432 may monitor the network traffic and effectively route the labeled groups of IP packets to the data-link layer 420, to reduce network congestion, latency, or packet loss for efficient use of network bandwidth in the high-speed satellite communication system. The network layer 430 uses the network address of the packet, e.g., IP address, to deliver the packet to the receiving system.

At the data-link layer 420, the bits of the received data packets are arranged into data frames for delivering to the receiving system. The data frames may include suitable headers and/or footers (e.g., source/destination addresses, error detection information, flow control instructions, etc.). The data frames are encoded by the data-link layer erasure encoder 315 and sent as bit streams through the physical layer 410, wherein the data-link layer FEC encoder 315 may be an erasure code encoder. The data-link layer FEC encoder or packet erasure encoder/decoder 315 of FIG. 3B can conduct data-link layer erasure encoding during transmitting and data-link layer erasure decoding during receiving procedure. As described above, the data frames encoded with the erasure code encoder can recover the missing data frames which are unrecoverable using physical layer FEC decoding, thereby obviating the need to retransmit the lost data frames over the higher network layers having higher data latency.

The physical layer 410 contains functionality necessary to carry the stream of data bits to the optical space terminals 102a through a medium. The physical layer 410 may comprise an optical beam control 422, optical PAs 424, optical LNAs 426, and optical modem & channel encode/decode components 428. The encoded data frames may be distributed to one of the multiple data channels (e.g., four channels) in the physical layer 410 by a distributor. In each of the multiple data channels, the encoded data frames may be encoded again by a physical layer FEC channel encoder/decoder 414$i$ into codewords, and the codewords may be sent to a modulator through respective individual interleaver channel (e.g., one of the four channels), and be converted to the optical beams by an optical modem 412$i$.

The optical modem & channel encode/decode components 428 may comprise the optical modem 412$i$ and FEC channel encoder/decoders 414$i$ for multiple data channels 314$i$ of FIG. 3B, wherein each of the multiple data channels 314$i$ has a respective FEC channel encoder/decoder 414$i$. The optical modem 412$i$ can provides electrical to optical conversion of electronic communication and data signals for transmission using high speed fiber optic cable. The optical modem 412$i$ can simultaneously receive incoming optical signals and convert them to the original electronic signal allowing for full duplex transmission. The optical modem 412$i$ can have single channel or multi-channel configurations and can be mounted on the optical terminals including on the ground or in space.

The optical beams, such as laser light carrying the electrical signals, may be modulated by a modulator 340 and amplified by one of the optical LNAs 426$i$ and/or one of the optical PAs 424$i$, and can be transmitted to the optimal space terminals 102 through multiple uplink atmosphere channels 140$i$. The modulator 340 may modulate the laser light of a designated wavelength according to the interleaved codewords 336$i$. The modulated laser light then can be processed with the optical PAs 424$i$. The optical PA 424$i$ and optical LNA 426$i$ can improve intensity of laser beam carrying encoded/decoded data by eliminating the noise and enhancing the encoded/decoded data. The optical PA is a device that amplifies an optical signal directly, without the need to first convert it to an electrical signal. The optical PA is commonly used for energizing the modulated laser light and to produce high power laser systems. Each of the multiple data channels 314$i$ may have its own optical PA. The optical PAs 424$i$ are important components in the satellite communication system for transmitting/receiving data in long distance telecommunication links, such as throughout the atmosphere/vacuum. The optical LNA 426$i$ can amplify a very low-power signal (e.g., the encoded data frames) without significantly degrading its signal-to-noise ratio, which can be designed to minimize additional noise. For example, a typical LNA may supply a power gain of 100 (20 decibels (dB)) while decreasing the signal-to-noise ratio by less than a factor of two (a 3 dB noise figure (NF)). This amplification can ensure the encoded data frames are sufficiently strong for transmitting, resulting in minimized data loss in the future process. There are several different physical mechanisms that can be used to amplify the laser light, which correspond to the major types of optical power amplifiers including doped fiber amplifiers, semiconductor optical amplifiers (SOAs), Raman amplifiers, or parametric amplifiers. The optical beams used for communication can be aligned with a communication terminal located on an earth-orbiting satellite (e.g., the optical space terminals 102a and 102b) and a terminal located on a ground station (e.g., the optical ground terminals 104a and 104b). A beam acquisition component of the optical ground terminal 104a may comprise a group of subassemblies and pointing and tracking control.

The amplified optical beams may be emitted through the medium by the optical beam control 422i. The optical beam control 422i may ensure that the laser beams are pointed to a respective spacecraft or the optical space terminal. In particular embodiments, the optical beam control 422i is used to control the multiple apertures 212i for aiming the laser beams 214i to the optical space terminals 102. The optical beam control can conduct acquisition, pointing and tracking of laser signals (e.g., the laser beams 214i). The optical beam control 422i can have a function to get the light beams efficiently coupled with the optical beams, which is a challenging task because of possible holes in the light beams. Another important task for the optical beam control 422i can be accurately directing the optical beams to the destinations, such as the optical space terminals 102a and 102b or a spacecraft, in a timely manner. Especially, since the spacecraft or the optical space terminals 102a and 102b may be moving objects, the optical beam control 422i may track the position of the moving objects and configure the optical ground terminals 104a and 104b to follow the moving object precisely.

Figure 5:
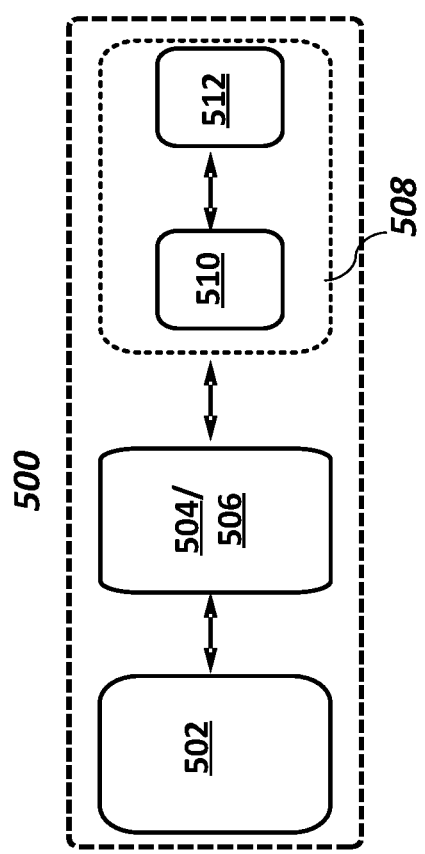
FIG. 5 is a block diagram of an example optical space terminal of a satellite communication system shown in FIG. 1 in accordance with particular embodiments.

FIG. 5 is a block diagram of an example optical space terminal of a satellite communication system shown in FIG. 1 in accordance with particular embodiments. The optical space terminal 500 may comprise a physical layer including an optical beam control 502, an optical power amplifier (PA) 504, an optical low noise amplifier (LNA) 506, an optical modem & channel Encode/Decode 508. During the forward channel communication, the optimal space terminal 500 may receive optical beams through the multiple uplink atmosphere channels 140i of FIG. 1 and decode the received optical beams. During the return channel communication, the optimal space terminal 500 may encode the data frames and transmit the optical beams to the optical ground terminal 104a through the return channel 150 of FIG. 1. The optical PA 504 and optical LNA 506 can improve intensity of laser beam carrying encoded/decoded data by eliminating the noise and enhancing the encoded/decoded data. The optical beam control 502 may ensure that the laser beams are directed to a respective spacecraft or the optical space terminal.

In particular embodiments, the optical beam control 502 is used to control the multiple apertures for receiving the laser beams from the optical ground terminal 104a, similarly to the optical beam control 422i described above.

In particular embodiments, the received optical beams then can be amplified by the optical PAs 504 and/or optical LNA 506, similarly to the optical PAs 424i and/or optical LNA 426i as described above. The received amplified optical beams can be processed by the demux 350, demodulators 355, channel deinterleavers 360, and the physical layer FEC decoders 365 of FIG. 3C.

As described above, the optical modem and channel encoder/decoder 508 can provides optical to electrical conversion of electronic communication and data signals for reception using high speed fiber optic cable. The optical modem 510 can have single channel or multi-channel configurations and can be mounted on the optical terminals, on the ground or in space. For example, the optical modem 510 mounted on the optical space terminal 500 may have a configuration of the single channel 150. The channel encoder/decoder 512 can conduct physical layer decoding during receiving forward channel communication. The optical modem 510 and channel encoder/decoder 512 can be implemented with programmable logic (e.g., FPGA) or integrated circuit (IC) technologies.

Figure 6:
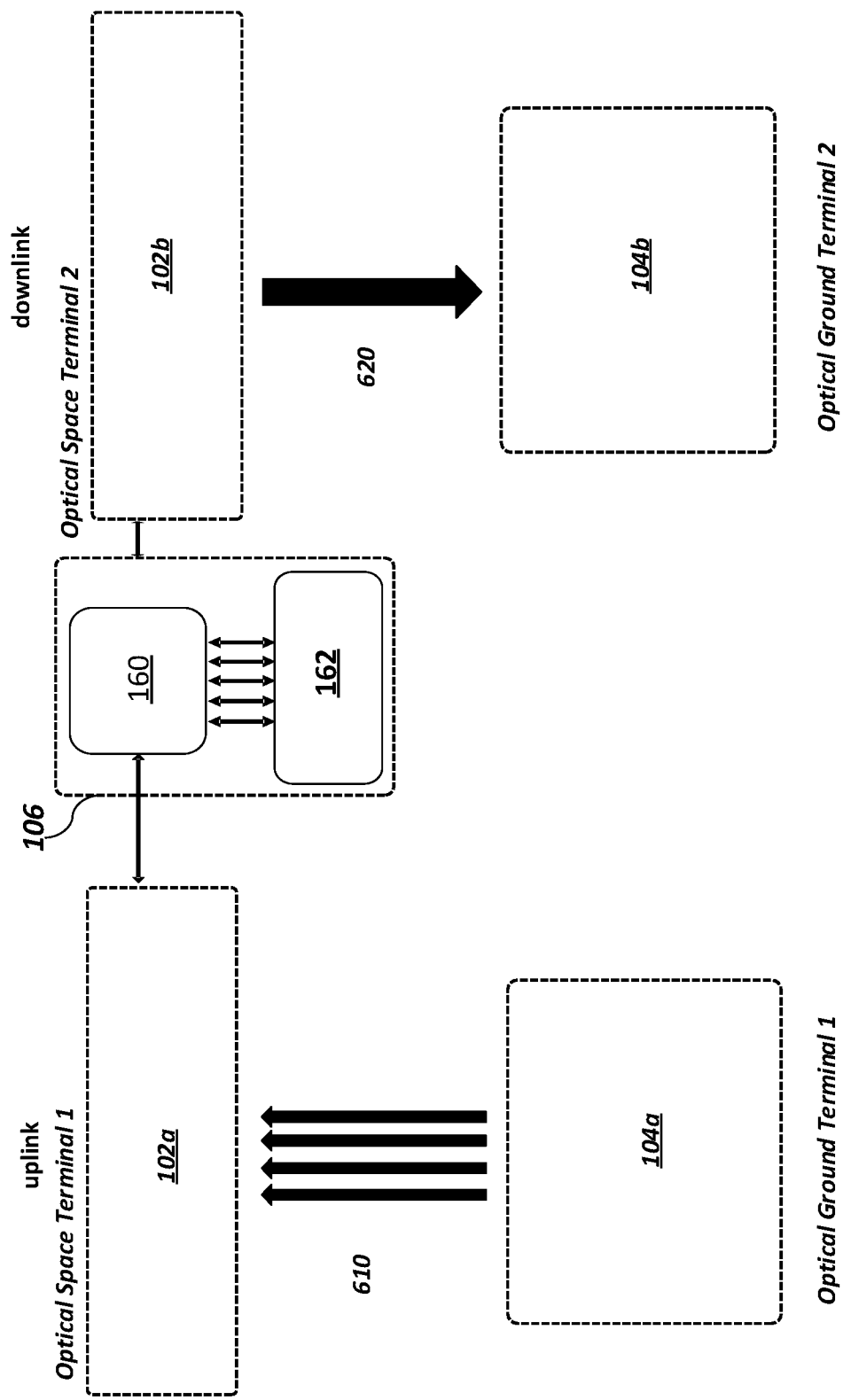
FIG. 6 is a block diagram of an example of bi-directional communication of a satellite communication system shown in FIG. 1 in accordance with particular embodiments.

FIG. 6 is a block diagram of an example of bi-directional communication of a satellite communication system shown in FIG. 1 in accordance with particular embodiments. The optical space terminals 102a and 102b and the optical ground terminals 104a and 104b of FIG. 1 may perform bi-directional communication including uplink and down link communications. The forward channel communication of the satellite communication system refers to transmission of signals from an earth station (e.g., the optical ground terminal 104a) to a space system (e.g., the optical space terminal 102a), or any high-altitude platform station. The return channel communication can be a reversed forward channel communication. The return channel communication refers to the transmission of signals from a space system (e.g., the optical space terminal 102b or any high-altitude platform station) to an earth station (e.g., the optical ground terminal 104b).

In particular embodiments, the satellite communication system can perform both the forward channel communication and the return channel communication through the atmosphere or vacuum using fiber optical technique. The forward channel communication can include encoding the uplink data and converting electrical signals of the uplink data into optical signals by the optical ground terminal 104a, transmitting the uplink data carried on the optical beams from the optical ground terminal 104a to the optical space terminal 102a through multiple free space fading atmospheric channels 610 (e.g., four channels), and converting the received optical beams into the electrical signals of the uplink data and decoding the received uplink data by the optical space terminal 102a. Details of the forward channel communication is described previously.

In particular embodiments, the satellite communication system can perform the down forward channel communication which includes encoding the downlink data and converting electrical signals of the downlink data into optical signals by the optical space terminal 102b, transmitting the downlink data carried on the optical beams from the optical space terminal 102b to the optical ground terminal 104b through a single free space fading atmospheric channel 620, and converting the received optical beams into the electrical signals of the downlink data and decoding the received downlink data by the optical ground terminal 104b.

As shown in FIG. 6, the return channel communication can occur between the optical space terminal 102b and the optical ground terminal 104b while the forward channel communication can occur between the optical space terminal 102a and the optical ground terminal 104a. The one-to-one pairing between the optical space terminals and the optical ground terminals can be configured by the satellite system and can be updated dynamically with the real-time communication situation, such as communication interruption or availability of the terminals.

Figure 7A:
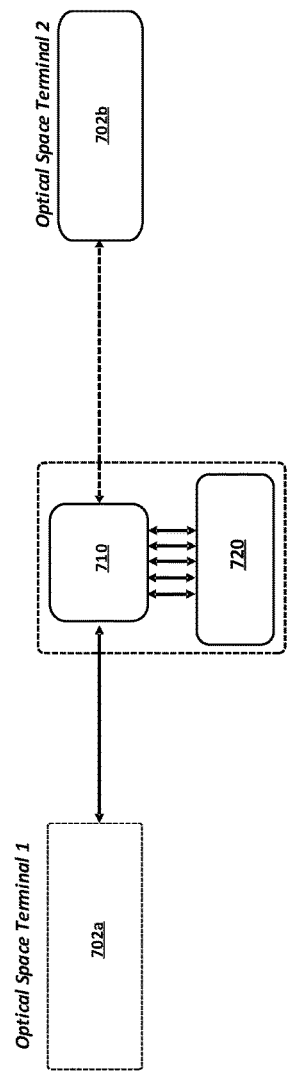
FIG. 7A is a block diagram of an example communication among optical space terminals of a satellite communication system shown in FIG. 1 in accordance with particular embodiments.

FIG. 7A is a block diagram of an example communication among optical space terminals of a satellite communication system shown in FIG. 1 in accordance with particular embodiments. The satellite communication system may have one or more optical space terminals including an optical space terminal 702a and another optical space terminal 702b, a space switch 710, and a RF channel former 720, wherein the optical space terminal 702a and 702b can receive or transmit physical layer level data. The RF channel former 720, along with other components in the space switch and FR channel former unit, may be used to process the physical layer data into the data-link layer or higher layer data packets. The details of the data routing operation are described previously.

In particular embodiments, the satellite communication system can build an optical communication channel, which enables the satellite communication system to fully regenerate user information packets on a spacecraft and route the user's information packets among the optical space terminals. The spacecraft mounted with the one or more optical space terminals can function as a data center on which the data packets at data-link layer or higher can be routed from one destination to another destination. For example, the physical layer level data received by the optical space terminal 702a can be forwarded to the space switch and RF channel former unit, and the physical layer level data may be regenerated into the data-link layer level data packets on the spacecraft. The regenerated data-link layer level data packets may be rerouted to the optical space terminal 702b. If the optical space terminal 702a is associated with a ground terminal at a destination (e.g., San Diego), and the optical space terminal 702b is associated with another ground terminal at another destination (e.g., Menlo Park), the satellite system may be operated as a data center rerouting the data packets from San Diego to Menlo Park.

Figure 7B:
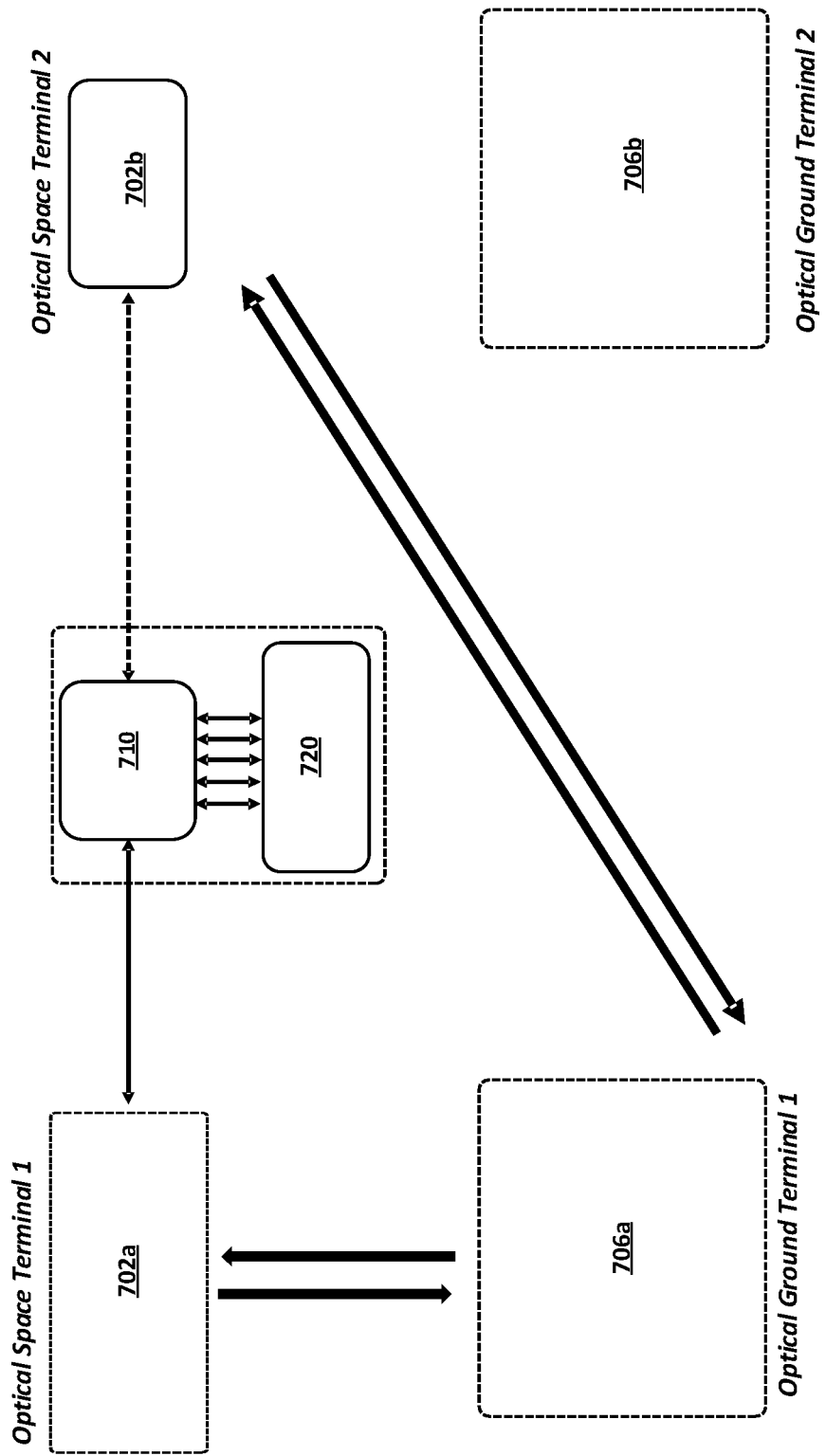
FIG. 7B is a block diagram of an example communication redirection of a satellite communication system shown in FIG. 1 in accordance with particular embodiments.

FIG. 7B is a block diagram of an example communication redirection of a satellite communication system shown in FIG. 1 in accordance with particular embodiments. In particular embodiments, the space switch 710 can be a make-before-break (MBB) switch and can redirect the traffic around at packets to packets level, wherein the packets may be the packets at the data-link level or higher. For example, the space switch 710 can be a Multiprotocol Label Switching (MPLS) directing data packets from one network terminal (e.g., the optical space terminal 702a) to the next network terminal (e.g., the optical space terminal 702b) based on short path labels for high-performance telecommunications networks, such as the satellite communication system. While one of the optical space terminals is a main operating space terminal 702a, one or more alternative optical space terminals may be included in the system as backups, such as the alternative optical space terminal 702b. When the operating optical space terminal 702a encounters potential communication problems, the alternative optical space terminal 702b may be located for taking over the ongoing uplink or return channel communication from the operating optical space terminal 702a. The space switch 710 (e.g., a terabit switch) may redirect the ongoing communication to the alternative optical space terminal 702b to prevent a possible communication breakdown. The satellite system may determine which optical space terminal is suitable for picking up the ongoing communication and redirect the communication thereto. For example, the satellite system may be able to determine the optical ground terminal 702b is available and has the appropriate capacity to take over the ongoing communication, and the ongoing communication can be redirected from the optical ground terminal 702a to the optical ground terminal 702b.

For example, the optical space terminal 702a is performing a forward channel communication with a respective optical ground terminal 706a. The optical space terminal 702a can be paired with the optical ground terminal 706a, such that the apertures in the optical ground terminal 706a can be adjusted for accurately aiming and emitting optical beams to the optical space terminal 702a. If a possible communication problem is detected by the satellite system, such as possible power outage or poor reception due to bad weather, the satellite system may determine that the optical space terminal 702b is available and can be the ideal candidate for picking up the ongoing forward channel communication from the optical space terminal 702a.

In particular embodiments, the space switch 710 may command the respective optical ground terminal 706a to adjust its apertures from aiming the optical space terminal 702a to aiming the optical space terminal 702b. In the meanwhile, the optical space terminal 702b may adjust its apertures for aiming the optical ground terminal 706a to get ready for forward channel communication thereto. Before the adjustment of the apertures are completed or the optical space terminal 702b is ready for receiving new uplink data from the optical ground terminal 706a, the optical space terminal 702a may continue receiving the uplink data from the optical ground terminal 706a and forward the received uplink data to the optical space terminal 702b for a smooth communication transition. In particular embodiments, the optical ground terminal 706a may transmit the uplink data to both the optical space terminal 702a and the optical space terminal 702b while the apertures are adjusted for establishing the new communication link. The space switch 710 can synchronize the adjustments of terminal apertures and redirection of uplink data communication, such that the communication transition from the optical space terminal 702a to optical space terminal 702b can be smooth and without interruption. Alternately, in particular embodiments, the optical ground terminal 706a can buffer the last portion of the uplink data and resend it to the optical space terminal 702b when the optical space terminal 702b is ready, for preventing a communication interruption and possible data transmission errors.

Similarly, a return channel communication can be redirected following the same principle. In particular embodiments, one or more redirecting mechanism discussed above can be utilized by the satellite system for a smooth transition to prevent communication breakdown.

Figure 8:
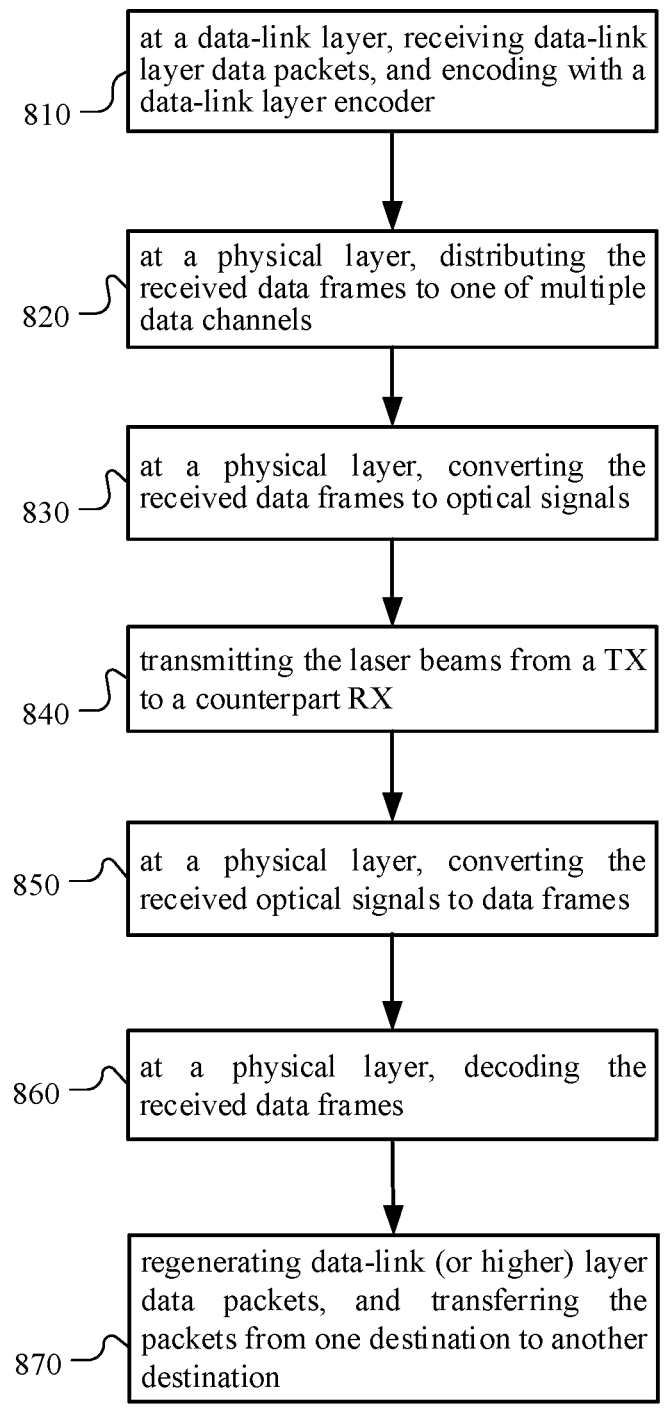
FIG. 8 illustrates an example method of optical satellite communication in accordance with particular embodiments.

FIG. 8 illustrates an example method of optical satellite communication in accordance with particular embodiments.

In particular embodiments, a bi-directional data transmission of a satellite communication may comprise a forward channel communication and a return channel communication, wherein the forward channel communication 800 may start at step 810, data-link layer data packets are received by a TX of an optical ground terminal, wherein the received data-link layer data packets are encoded by a data-link layer packet erasure forward error correction (FEC) encoder. The received data-link layer data packets are first arranged into a plurality of data frames, and the plurality of data frame are encoded by the data-link layer packet erasure FEC encoder. The number of the data frames before encoding may be different than the number of the encoded data frames. The encoded data frames then are sent to the physical layer.

At step 820, the encoded data frames are received from the data-link layer. The received encoded data frames are processed at the physical layer. The encoded data frames are distributed by a distributor to one of a plurality of data channels. Within each of the data channels, the encoded data frames are encoded again by a physical layer FEC encoder into codewords. Then the codewords are interleaved by a channel interleaver.

At step 830, the interleaved encoded data frames are inputs to an optical modem which perform the conversion between the electrical signals and optical signals. The outputs of the optical modem are the optical signals, wherein the optical signals are modulated by a modulator. After being modulated, the optical signals are amplified by an optical power amplifier (PA) and/or an optical low-noise amplifier (LNA). The modulated and amplified optical signals are coupled with laser beams by a beam control, wherein the beam control also ensure that the transmitting apertures of the optical ground terminal are aimed to the receiving apertures of a respective optical space terminal.

At step 840, the laser beams are transmitted through the air or vacuum via multiple forward channels. Each laser beam may carry light at a specific wavelength corresponding to one of the data channels. Thus, multiple laser beams may transmit independent data streams through the air or vacuum for increasing throughput of the satellite system. The laser beams are received by a RX of an optical space terminal, wherein the optical space terminal and the optical ground terminal are paired by the satellite system configuration, such that receiving apertures of the optical space terminal and transmitting apertures of the optical ground terminal are configured to aim to each other for the bi-directional communication.

At step 850, the laser beams of one of the multiple forward channels are selected and received, and the received laser beams are amplified by an optical power amplifier (PA) and/or an optical low-noise amplifier (LNA), and further are demodulated by a demodulator. The modulated and amplified optical signals are converted into interleaved codewords by an optical modem.

At step 860, the interleaved codewords are deinterleaved by a channel deinterleaver, and further are decoded by a physical layer FEC decoder into pre-interleaved ordered codewords.

At step 870, the physical layer data frames may be regenerated into data-link layer data packets, or any data packets at a layer higher than physical layer. The higher layer data packets can be transferred from one optical space terminal to another optical space terminal on the spacecraft, wherein each of the optical space terminal may be associated with a particular destination (e.g., a corresponding optical ground terminal). Thus, the data packets are transmitted from one destination to another destination.

Figure 9:
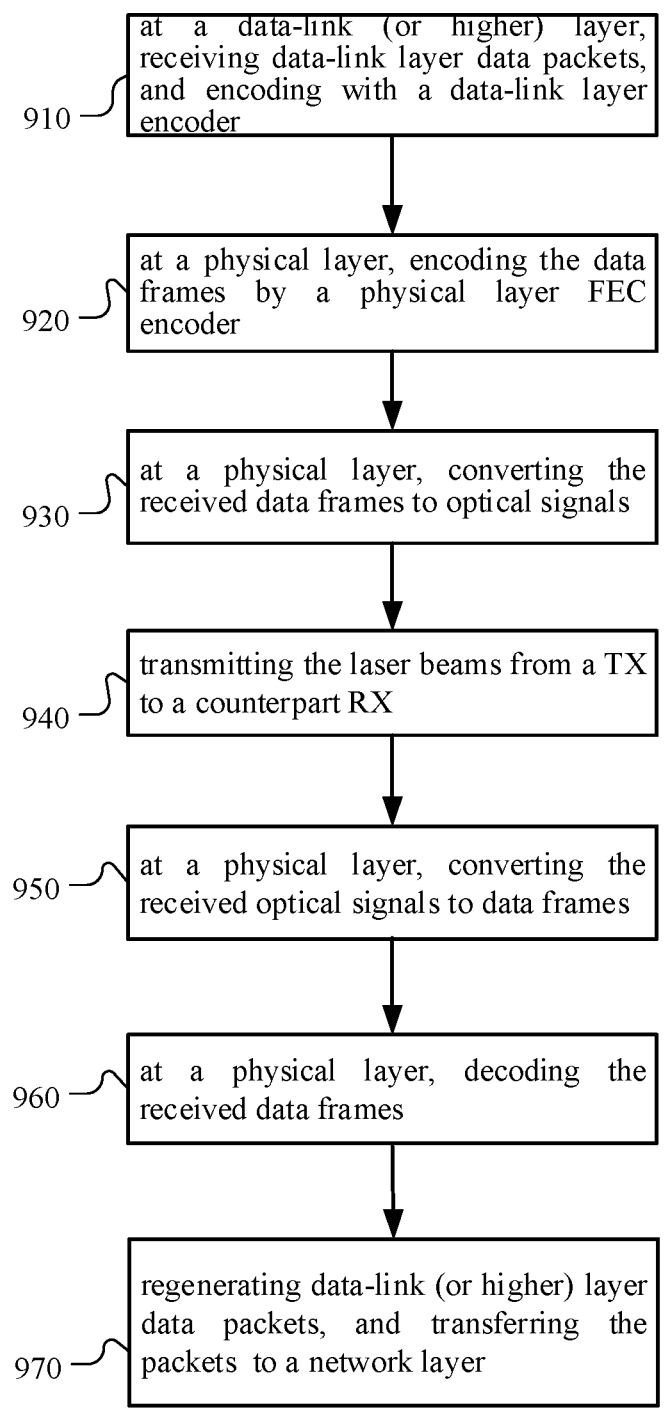
FIG. 9 illustrates another example method of optical satellite communication in accordance with particular embodiments.

FIG. 9 illustrates another example method of optical satellite communication in accordance with particular embodiments.

In particular embodiments, a return channel communication 900 may start at step 910, data-link layer data packets are received by a TX of an optical space terminal, wherein the received data-link layer data packets are encoded by a data-link layer packet erasure forward error correction (FEC) encoder. The received data-link layer data packets are first arranged into a plurality of data frames, and the plurality of data frame are encoded by the data-link layer packet erasure FEC encoder. The number of the data frames before encoding may be different than the number of the encoded data frames. The encoded data frames then are sent to the physical layer.

At step 920, the encoded data frames are received from the data-link layer. The received encoded data frames are processed at the physical layer in a data channel. Within the data channel, the encoded data frames are encoded again by a physical layer FEC encoder into codewords. Then the codewords are interleaved by a channel interleaver.

At step 930, the interleaved encoded data frames are inputs to an optical modem which perform the conversion between the electrical signals and optical signals. The outputs of the optical modem are the optical signals, wherein the optical signals are modulated by a modulator. After being modulated, the optical signals are amplified by an optical power amplifier (PA) and/or an optical low-noise amplifier (LNA). The modulated and amplified optical signals are coupled with laser beams by a beam control, wherein the beam control also ensure that the transmitting apertures of the optical ground terminal are aimed to the receiving apertures of a respective optical ground terminal.

At step 940, the laser beams are transmitted through the air or vacuum via a single return channels. The laser beams are received by a counterpart RX of an optical ground terminal, wherein the optical ground terminal and the optical ground terminal are paired by the satellite system configuration, such that receiving apertures of the optical ground terminal and transmitting apertures of the optical space terminal are configured to aim to each other for the bi-directional communication.

At step 950, the laser beams are received and selected by one of the data channels. In selected data channel, the received laser beams are amplified by an optical power amplifier (PA) and/or an optical low-noise amplifier (LNA), and further are demodulated by a demodulator. The modulated and amplified optical signals are converted into interleaved codewords by an optical modem.

At step 960, the interleaved codewords are deinterleaved by a channel deinterleaver, and further are decoded by a physical layer FEC decoder into pre-interleaved ordered codewords.

At step 970, the physical layer data frames may be regenerated into data-link layer data packets, or any data packets at a layer higher than physical layer. The higher layer data packets can be transferred to a network layer. Thus, a cycle of data transfer from one destination to another destination is completed.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system comprising:
one or more optical ground terminals, and a spacecraft having at least one or more optical space terminals and a space switch unit, wherein each optical ground terminal comprises an optical beam control configured to conduct acquisition, pointing, and tracking of laser signals, and wherein each optical beam control is configured to direct transmitted data frames to a counterpart optical space terminal, wherein the spacecraft is configured to:
receive a plurality of encoded data frames by a forward channel receiver (RX) of one optical space terminal from a counterpart forward channel transmitter (TX) of a respective optical ground terminal via multiple forward channels through air/vacuum, wherein the respective optical ground terminal is paired with the optical space terminal for data communication, and the encoded data frames are encoded by the counterpart forward channel TX of the respective optical ground terminal;
decode the plurality of encoded data frames by the forward channel RX of the optical space terminal;
regenerate a plurality of data packets based on the plurality of decoded data frames by the space switch unit, wherein the data packets are at a layer of data-link or higher;
route the regenerated data packets to another optical space terminal by the space switch unit, wherein another optical space terminal is paired with another optical ground terminals for data communication; and
transmit a plurality of encoded data frames by a return channel TX of one optical space terminal to a counterpart return channel RX of a respective optical ground terminal via a return channel through air/vacuum, wherein the optical space terminal is paired with the respective optical ground terminal for data communication, and wherein the encoded data frames are encoded by the return channel TX of the optical space terminal.

2. The system of claim 1, wherein the space switch unit comprises at least a space switch and a RF channel former, wherein the RF channel former has a regenerative multi-channel RF modem.

3. The system of claim 2, wherein the regenerative multi-channel RF modem has a power amplifier (PA) and/or a low noise amplifier (LNA) in each channel.

4. The system of claim 2, wherein the space switch is a terabit switch conducting data packet switch at the layer of data-link or higher.

5. The system of claim 2, wherein the space switch is a make-before-break (MBB) switch detecting upcoming communication interruption and redirecting ongoing data communication from one of the optical space terminals to another one of the optical space terminals.

6. The system of claim 1, wherein the spacecraft is further configured to:
decode the plurality of encoded data frames by the counterpart return channel RX of the respective optical ground terminal; and
regenerate a plurality of data packets based on the plurality of decoded data frames by the counterpart return channel RX of the respective optical ground terminal, wherein the data packets are at a layer of data-link or higher.

7. The system of claim 6, wherein the spacecraft is further configured to transmit the plurality of data packets to a network layer.

8. A method comprising:
receiving, by a spacecraft having at least one or more optical space terminals and a space switch unit, wherein each optical space terminal comprises an optical beam control configured to conduct acquisition, pointing, and tracking of laser signals, and wherein each optical beam control is configured to direct transmitted data frames to a counterpart optical ground terminal, a plurality of encoded data frames by a forward channel receiver (RX) of one optical space terminal from a counterpart forward channel transmitter (TX) of a respective optical ground terminal via multiple forward channels through air/vacuum, wherein the respective optical ground terminal is paired with the optical space terminal for data communication, and the encoded data frames are encoded by the counterpart forward channel TX of the respective optical ground terminal;
decoding, by the spacecraft, the plurality of encoded data frames by the forward channel RX of the optical space terminal;
regenerating, by the spacecraft, a plurality of data packets based on the plurality of decoded data frames by the space switch unit, wherein the data packets are at a layer of data-link or higher;
routing, by the spacecraft, the regenerated data packets to another optical space terminal by the space switch unit, wherein another optical space terminal is paired with another optical ground terminals for data communication; and
transmitting, by the spacecraft, a plurality of encoded data frames by a return channel TX of one optical space terminal to a counterpart return channel RX of a respective optical ground terminal via a return channel through air/vacuum, wherein the optical space terminal is paired with the respective optical ground terminal for data communication, and the encoded data frames are encoded by the return channel TX of the optical space terminal.

9. The method of claim 8, wherein the space switch unit comprises at least a space switch and a RF channel former, wherein the RF channel former has a regenerative multi-channel RF modem.

10. The method of claim 9, wherein the regenerative multi-channel RF modem has a power amplifier (PA) and/or a low noise amplifier (LNA) in each channel.

11. The method of claim 9, wherein the space switch is a terabit switch conducting data packet switch at the layer of data-link or higher.

12. The method of claim 9, wherein the space switch is a make-before-break (MBB) switch detecting upcoming communication interruption and redirecting ongoing data communication from one of the optical space terminals to another one of the optical space terminals.

13. The method of claim 8, further comprising:
decoding the plurality of encoded data frames by the counterpart return channel RX of the respective optical ground terminal; and
regenerating a plurality of data packets based on the plurality of decoded data frames by the counterpart return channel RX of the respective optical ground terminal, wherein the data packets are at a layer of data-link or higher.

14. The method of claim 13, further comprising:
transmitting the plurality of data packets to a network layer.

15. One or more computer-readable non-transitory storage media embodying software that is operable when executed, by a spacecraft having at least one or more optical space terminals and a space switch unit, wherein each optical space terminal comprises an optical beam control configured to conduct acquisition, pointing, and tracking of laser signals, and wherein each optical beam control is configured to direct transmitted data frames to a counterpart optical ground terminal, to:
receive a plurality of encoded data frames by a forward channel receiver (RX) of one optical space terminal from a counterpart forward channel transmitter (TX) of a respective optical ground terminal via multiple forward channels through air/vacuum, wherein the respective optical ground terminal is paired with the optical space terminal for data communication, and the encoded data frames are encoded by the counterpart forward channel TX of the respective optical ground terminal;
decode the plurality of encoded data frames by the forward channel RX of the optical space terminal;
regenerate a plurality of data packets based on the plurality of decoded data frames by the space switch unit, wherein the data packets are at a layer of data-link or higher;
route the regenerated data packets to another optical space terminal by the space switch unit, wherein another optical space terminal is paired with another optical ground terminals for data communication; and
transmit a plurality of encoded data frames by a return channel TX of one of optical space terminals to a counterpart return channel RX of a respective optical ground terminal via a return channel through air/vacuum, wherein the optical space terminal is paired with the respective optical ground terminals for data communication, and the encoded data frames are encoded by the return channel TX of the optical space terminal.

16. The media of claim 15, wherein the space switch unit comprises at least a space switch and a RF channel former, wherein the RF channel former has a regenerative multi-channel RF modem.

17. The media of claim 16, wherein the regenerative multi-channel RF modem has a power amplifier (PA) and/or a low noise amplifier (LNA) in each channel.

18. The media of claim 16, wherein the space switch is a terabit switch conducting data packet switch at the layer of data-link or higher.

19. The media of claim 16, wherein the space switch is a make-before-break (MBB) switch detecting upcoming communication interruption and redirecting ongoing data communication from one of the optical space terminals to another one of the optical space terminals.

20. The media of claim 15, wherein the software is further operable when executed to:
decode the plurality of encoded data frames by the counterpart return channel RX of the respective optical ground terminal; and
regenerate a plurality of data packets based on the plurality of decoded data frames by the counterpart return channel RX of the respective optical ground terminal, wherein the data packets are at a layer of data-link or higher.

21. A system comprising:
means for receiving, by a spacecraft having at least one or more optical space terminals and a space switch unit, wherein each optical space terminal comprises an optical beam control configured to conduct acquisition, pointing, and tracking of laser signals, and wherein each optical beam control is configured to direct transmitted data frames to a counterpart optical ground terminal, a plurality of encoded data frames by a forward channel receiver (RX) of one optical space terminal from a counterpart forward channel transmitter (TX) of a respective optical ground terminal via multiple forward channels through air/vacuum, wherein the respective optical ground terminal is paired with the optical space terminal for data communication, and the encoded data frames are encoded by the counterpart forward channel TX of the respective optical ground terminal;
means for decoding, by the spacecraft, the plurality of encoded data frames by the forward channel RX of the optical space terminal;
means for regenerating, by the spacecraft, a plurality of data packets based on the plurality of decoded data frames by the space switch unit, wherein the data packets are at a layer of data-link or higher;
means for routing, by the spacecraft, the regenerated data packets to another optical space terminal by the space switch unit, wherein another optical space terminal is paired with another optical ground terminals for data communication; and
means for transmitting, by the spacecraft, a plurality of encoded data frames by a return channel TX of one optical space terminal to a counterpart return channel RX of a respective optical ground terminal via a return channel through air/vacuum, wherein the optical space terminal is paired with the respective optical ground terminal for data communication, and the encoded data frames are encoded by the return channel TX of the optical space terminal.

* * * * *